(12) United States Patent
Shapiro et al.

(10) Patent No.: US 7,877,012 B2
(45) Date of Patent: Jan. 25, 2011

(54) SELECTING OPTICAL WAVES

(75) Inventors: Jeffrey H. Shapiro, Sharon, MA (US); Franco N. C. Wong, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 833 days.

(21) Appl. No.: 11/760,241

(22) Filed: Jun. 8, 2007

(65) Prior Publication Data

US 2008/0050126 A1    Feb. 28, 2008

Related U.S. Application Data

(60) Provisional application No. 60/823,708, filed on Aug. 28, 2006.

(51) Int. Cl.
*H04J 14/00*    (2006.01)
*H04B 10/20*    (2006.01)

(52) U.S. Cl. ............................. 398/57; 398/45; 398/53; 398/55; 380/256

(58) Field of Classification Search ................. 380/256; 385/16, 17; 398/45–57, 61, 83; 359/618, 359/629, 636, 637, 638
See application file for complete search history.

(56) References Cited

U.S. PATENT DOCUMENTS

| | | | |
|---|---|---|---|
| 6,275,312 B1 | 8/2001 | Derks et al. | |
| 6,456,752 B1 * | 9/2002 | Dragone | ....................... 385/17 |
| 6,459,826 B1 * | 10/2002 | Boivin et al. | ................... 385/11 |
| 2005/0280814 A1 | 12/2005 | Juliano | |

OTHER PUBLICATIONS

Migdall et al., "Single Photon Source with Individualized Single Photon Certifications", Sep. 17, 2002, Proc. of the SPIE, vol. 4821, pp. 455-465.*
Richard R.A. Syms, "Scaling Laws for MEMS Mirror-Rotation Optical Cross Connect Switches," Journal of Lightwave Technology, vol. 20, No. 7, Jul. 2002.
A. L. Migdall, D. Branning, and S. Castelletto "Tailoring single-photon and multiphoton probabilities of a single-photon on-demand source," Physical Review A 66, 053805 (2002).
A. Migdall, S. Castelletto, and M. Ware, "Status of Multiplexed Single Photon On-Demand Source," Proc. SPIE 5105, 294-302 (2003).
Migdall et al., "Single Photon Source with Individualized Single Photon Certifications" Downloaded from http://export.arxiv.org/pdf/quant-ph/0209103 on Jul. 14, 2006, Sep. 17, 2002.
PCT International Search Report and Written Opinion (dated Mar. 4, 2008) for International Application No. PCT/US07/70988, 10 pages.

* cited by examiner

*Primary Examiner*—Ken N Vanderpuye
*Assistant Examiner*—Daniel G Dobson
(74) *Attorney, Agent, or Firm*—Fish & Richardson P.C.

(57) ABSTRACT

A control module is configured to receive one or more input signals. An optical selection network includes a plurality of optical input ports configured to receive respective optical waves at an operative wavelength, and at least one optical output port configured to provide an optical wave at the optical wavelength. The optical selection network is configured to receive one or more control signals from the control module, and in response to the control signals, provide a high transmission path for the operative wavelength from an optical input port, determined by the input signals, to the optical output port at a predetermined time with respect to a time reference in at least one of the input signals, and provide a low transmission path for the operative wavelength from each of a plurality of optical input ports, determined by the input signals, to the optical output port at the predetermined time.

38 Claims, 5 Drawing Sheets

SELECTING OPTICAL WAVES

CROSS-REFERENCE TO RELATED APPLICATIONS

This application claims priority to U.S. Application Ser. No. 60/823,708, filed on Aug. 28, 2006.

BACKGROUND

The invention relates to selecting optical waves.

Various systems use electromagnetic waves whose spectral content is in the optical portion of the electromagnetic spectrum, called "optical waves" or "light waves." The optical portion of the electromagnetic spectrum includes, for example, the visible spectrum, the infrared (IR) spectrum, and the ultraviolet (UV) spectrum. Optical waves can propagate in non-guided spatial modes (or "free space" modes) within an optical system, or in guided spatial modes within guiding media such as optical fibers or waveguides in optical devices. An optical combining device can combine multiple optical waves such that they propagate along the same propagation axis and, in some cases, in the same spatial mode. An optical splitting device can separate optical waves from a wave received over an optical input port based on properties such as wavelength, spatial mode, or polarization. Some devices can both combine and separate different optical waves, such as an add-drop multiplexer, which drops and adds optical waves based on wavelength.

Some devices can act as either a combiner or splitter. For example, a polarizing beam splitter (PBS) can split an optical wave entering a first port into a vertically polarized optical wave from a second port and a horizontally polarized optical wave from a third port. Alternatively, the PBS can combine a vertically polarized optical wave entering the second port and a horizontally polarized optical wave entering the third port to leave the first port having the same propagation axis.

Some applications call for an "optical cross-connect" or "optical switching circuit" that connects a given optical input port to a given optical output port based on one or more control signals. A desired optical wave can be selected by providing a high transmission optical path from the corresponding input port to the output port. For example, some micro-electro-mechanical systems (MEMS) devices tilt mirrors in response to control signals to select which of multiple optical input ports to direct to a given optical output port.

SUMMARY

In one aspect, in general, an apparatus includes a control module configured to receive one or more input signals, and an optical selection network. The optical selection network includes a plurality of optical input ports configured to receive respective optical waves at an operative wavelength, and at least one optical output port configured to provide an optical wave at the optical wavelength. The optical selection network is configured to receive one or more control signals from the control module, and in response to the control signals, provide a high transmission path for the operative wavelength from an optical input port, determined by the input signals, to the optical output port at a predetermined time with respect to a time reference in at least one of the input signals, and provide a low transmission path for the operative wavelength from each of a plurality of optical input ports, determined by the input signals, to the optical output port at the predetermined time.

Aspects can include one or more of the following features.

Each low transmission path includes at least one polarization-dependent optical element configured to prevent most of the energy in an optical wave propagating over the low transmission path from leaving the optical output port.

The polarization-dependent optical element is configured to prevent at least 99% of the energy from leaving the optical output port.

The polarization-dependent optical element is configured to prevent at least 99.9% of the energy from leaving the optical output port.

The polarization-dependent optical element comprises a polarizing beam splitter.

The optical selection network is configured to place an optical wave propagating over a low transmission path into a polarization state that is cross-polarized with a polarization state defined by at least one polarizing optical element along the path.

The optical selection network is configured to place the optical wave propagating over the high transmission path into a polarization state that matches a polarization state defined by the optical output port.

The high transmission path and each low transmission path have substantially the same optical path length from the respective optical input port to the optical output port.

Providing the high and low transmission paths comprises changing a polarization transformation imparted by the optical selection network.

Changing the polarization transformation imparted by the optical selection network comprises changing a polarization rotation imparted to a substantially linear polarization state.

Changing the polarization transformation imparted by the optical selection network comprises changing a relative phase shift imparted to polarization components along orthogonal polarization axes.

Changing the polarization transformation imparted by the optical selection network comprises applying a voltage to at least one electro-optic modulator.

The optical selection network comprises a plurality of selection modules optically coupled to form a network.

Each selection module comprises at least two input ports configured to receive an optical wave in a predetermined polarization state, and at least one output port configured to provide an optical wave in the predetermined polarization state.

Each selection module further comprises a polarizing beam combiner configured to: receive an optical wave from a first input port in a first polarization state, receive an optical wave from a second input port rotated by a rotation element into a second polarization state; and provide a combined optical wave comprising the received optical waves.

The apparatus further comprises an electro-optic modulator in optical communication with the polarizing beam combiner configured to control the polarization state of the combined optical wave based on one or more of the control signals.

Providing the high and low transmission paths comprises changing a polarization transformation imparted by a subset of the optical modules determined by the input signals.

The selection modules are optically coupled to form a network having a tree topology.

The selection modules are optically coupled to form a network having a binary tree topology.

In another aspect, in general, a method includes: receiving one or more input signals; receiving at a plurality of optical input ports respective optical waves at an operative wavelength, and providing an optical wave at the optical wavelength at least one optical output port; and providing one or more control signals based on the input signals. The method also includes, in response to the control signals, providing a high transmission path for the operative wavelength from an optical input port, determined by the input signals, to the optical output port at a predetermined time with respect to a time reference in at least one of the input signals, and providing a low transmission path for the operative wavelength from each of a plurality of optical input ports, determined by the input signals, to the optical output port at the predetermined time.

Aspects can include one or more of the following features.

Each low transmission path prevents most of the energy in an optical wave propagating over the low transmission path from leaving the optical output port based on polarization of the optical wave.

Each low transmission path prevents at least 99% of the energy from leaving the optical output port.

Each low transmission path prevents at least 99.9% of the energy from leaving the optical output port.

The method further comprises placing an optical wave propagating over a low transmission path into a polarization state that is cross-polarized with a polarization state defined by at least one polarizing optical element along the path.

The method further comprises placing the optical wave propagating over the high transmission path into a polarization state that matches a polarization state defined by the optical output port.

The high transmission path and each low transmission path have substantially the same optical path length from the respective optical input port to the optical output port.

Providing the high and low transmission paths comprises changing a polarization transformation imparted to an optical wave propagating over at least one of the high and low transmission paths.

Changing the polarization transformation imparted to the optical wave comprises changing a polarization rotation imparted to a substantially linear polarization state.

Changing the polarization transformation imparted to the optical wave comprises changing a relative phase shift imparted to polarization components along orthogonal polarization axes.

Changing the polarization transformation imparted to the optical wave comprises applying a voltage to at least one electro-optic modulator.

In another aspect, in general, a system includes: a plurality of photon generation modules, each providing at least two photons generated in the same optical interaction including a heralded photon and an associated herald photon; a control module configured to detect at least some of the herald photons from each of the photon generation modules; and an optical selection network comprising a plurality of selection modules optically coupled to form a network having a binary tree topology, wherein each selection module includes at least two optical input ports and at least one optical output port, and the optical selection network is configured to emit a selected one of the heralded photons based on one or more control signals from the control module.

Aspects can include one or more of the following features.

The photon generation modules comprise parametric downconverters, each providing a pair of signal and idler photons generated in a spontaneous parametric downconversion interaction as the heralded photon and associated herald photon.

The system further comprises respective polarizing beam splitters to separate orthogonally polarized signal and idler photons generated by the parametric downconverters.

The system further comprises respective wavelength-dependent splitters to separate signal and idler photons generated by the parametric downconverters based on wavelength.

The system further comprises a pump laser to provide a pump optical wave to each of the parametric downconverters.

The pump optical wave comprises pulses.

The system further comprises an optical delay network configured to provide the pump pulses to the parmaeteric downconverters synchronously.

Aspects can have one or more of the following advantages.

The optical selection network can be used in a variety of applications, such as the multiplexed single-photon on-demand source proposed by Migdall et al., described in more detail below, to provide fast and stable optical port selection. For example, mediating optical port selection using electro-optic polarization control enables faster switching times than mechanical control in MEMS systems. The optical selection network is also able to provide single-port selection in which input ports that are not selected are blocked to prevent coupling of those input ports to a given output port. A control module is able to provide synchronized port selection by coordinating the electro-optic polarization control to a time reference in an input signal.

Facilitating the generation of single photons "on demand" (e.g., with a high probability of providing a single photon in a given time slot) is a key technology enabler in many areas of the field of quantum information science. For example, on-demand single-photon generation can significantly improve the performance of quantum key distribution (QKD), quantum communications, and quantum computation. It can facilitate the realization of on-demand entangled photons and quantum logic circuits, and can simplify the calibration of single-photon detectors.

Unless otherwise defined, all technical and scientific terms used herein have the same meaning as commonly understood by one of ordinary skill in the art to which this invention belongs. In case of conflict with publications, patent applications, patents, and other references mentioned incorporated herein by reference, the present specification, including definitions, will control.

Other features and advantages of the invention will become apparent from the following description, and from the claims.

DESCRIPTION

Figure 1:
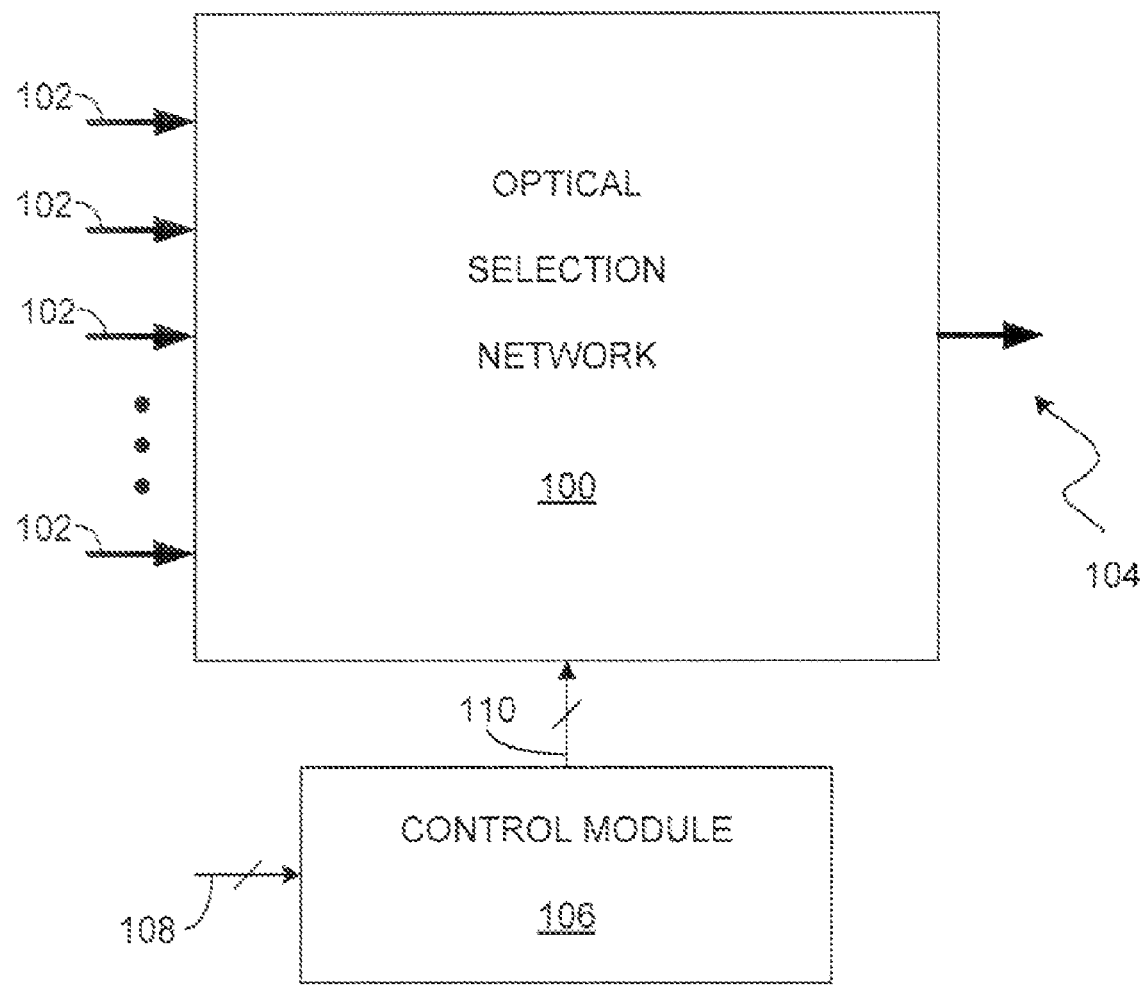
FIGS. 1 and 2 are block diagrams of an optical selection network and a control module.

Referring to FIG. 1, an optical selection network 100 includes multiple optical input ports 102 configured to receive respective optical waves. The optical waves can have any of a variety of characteristics. For example, an optical wave can be coherent or incoherent, continuous or pulsed, strong or weak (e.g., having a high probability of only a single photon in a given time interval). In some cases, the selection of a given optical input port 102 is synchronized to time characteristics (e.g., pulse locations) of the optical waves. The optical selection network 100 directs an optical wave arriving at a selected input port to an optical output port 104 and blocks most of the energy in optical waves arriving at other input ports from leaving the output port 104.

The optical selection network 100 is controlled by a control module 106 configured to receive one or more input signals 108 that identify which of the optical input ports 102 is to be directed to the optical output port 104. The control module 106 provides one or more control signals 110 to control the input-to-output transmission characteristics of the optical paths in the optical selection network 100. The optical selection network 100 is configured to receive the control signals 110, and in response to the control signals 110, provide corresponding high or low transmission paths from each of the optical input ports 102 to the optical output port 106.

The control of the transmission characteristics can be synchronized to a time reference in one of the input signals 108. For example, in some implementations, each optical input port 102 has a corresponding input signal 108 that indicates whether a desired optical wave (e.g., a photon) is present at that optical input port 102 at a known instant in time relative to the time reference (e.g., a rising edge of a pulse). The presence of a pulse in an input signal 108 indicates that the desired optical wave is present, and the absence of a pulse in an input signal 108 indicates that the desired optical wave is not present. For a case in which only one optical input port 102 receives a desired optical wave, the control module 106 selects that optical input port 102 to have a high transmission path to the optical output port 106. For a case in which more than one optical input port 102 has a desired optical wave, the control module 106 selects one of those optical input ports 102 to have a high transmission path to the optical output port 106. The control module 106 provides control signals 110 to set a low transmission path from each of the other optical input ports to the optical output port 104.

Figure 2:
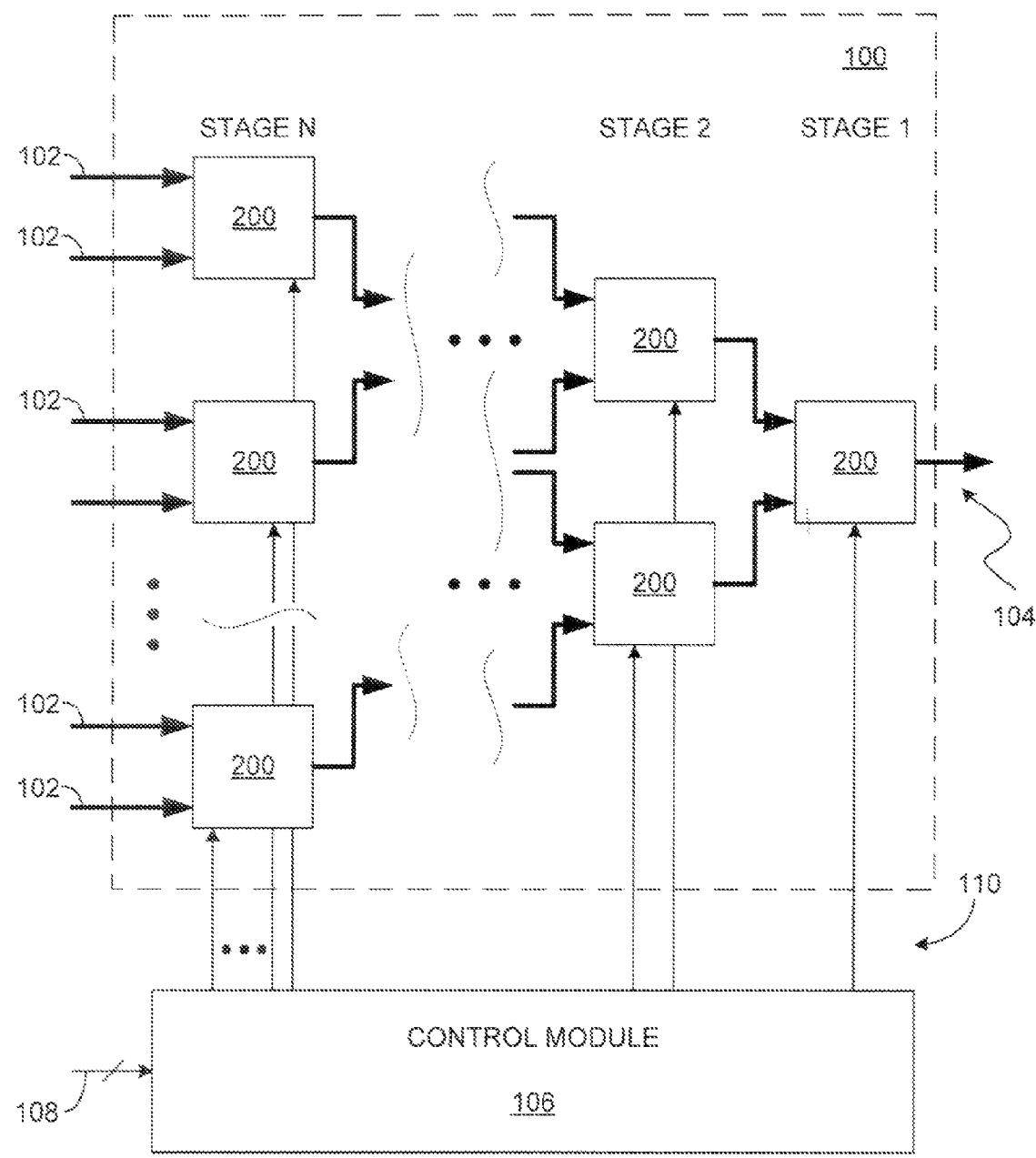

FIG. 2 shows an exemplary optical selection network 100 that includes selection modules 200 optically coupled to form a network. In this example, the selection modules 200 each have two input ports and one output port, and the network has a binary tree topology. Other network topologies can be formed from other types of selection modules. The selection modules 200 include at least one polarization-dependent optical element that enables the selection module to provide low transmission for one of two polarized optical inputs and high transmission for the other polarized optical input to an output port.

For example, a polarizing beam combiner can be used to combine two orthogonal linearly polarized waves, and then a controlled polarization transformation can be selectively applied to control which polarization state is aligned with an output polarization state defined by the output port of the selection module 200. The output polarization state can be defined by a polarizing optical element, which is able to prevent most of the energy in an optical wave from leaving the output port if the optical wave is cross-polarized with the defined polarization state. For example, a polarizing beam splitter can be used to reflect an optical wave that is polarized vertically (with respect to a plane of incidence), and pass an optical wave that is polarized horizontally. In this example, the horizontally polarized optical wave experiences high transmission through the selection module 200 (e.g., >90% or >95%), and the vertically polarized optical wave experiences low transmission through the selection module 200 (e.g., <1% or <0.1%).

The control signals 110 provided by the control module 106 can control which optical input ports 102 correspond to the high or low transmission paths by changing a polarization transformation imparted by the selection modules 200 of the optical selection network 100. For example, the control signals 110 can change a polarization rotation imparted to substantially linear polarization states at the inputs of the selection module 200. This polarization rotation can be controlled by changing a relative phase shift imparted to polarization components of an optical wave. For example, a voltage can be applied to an electro-optic modulator to impart the desired relative phase shift. The control module 106 can provide a control signal for each selection module 200 so that one of the input ports leads to a high transmission path for a linear input polarization to the output port and the other input port (or ports) lead to low transmission paths for a linear input polarization to the output port. Thus, each selection module 200 is in a high transmission state for one input port and in a low transmission state for the other input port (or ports) at the time a control signal is applied. While the control signals 110 do not necessarily need to be applied to all of the control modules 106 at the same time, since an optical wave takes time to propagate from one selection module 200 to another, the optical propagation time through a relatively compact optical selection network 100 would be negligible compared to a typical electronic response time for switching a selection module 200.

The optical selection network 100 can be configured to be compatible with desired characteristics of a given application in which it is being used. The selection modules 200 can be configured to operate over a given operating bandwidth to allow selection among optical waves having a given operative wavelength that falls within the operating bandwidth. The selection modules 200 can be optically coupled using unguided free-space paths or using guided media (e.g., optical fiber). The selection modules 200 can be coupled in a tree topology. In the binary tree topology of the implementation shown in FIG. 2, STAGE 1 includes a selection module 200 that provides the optical output port 104, and STAGE n includes $2^{n-1}$ selection modules 200 (where n=2 to N). A balanced tree topology enables the high transmission path and each low transmission path to have substantially the same optical path length from each of the optical input ports 102 to the optical output port 104, which enables the same delay to be imparted by the optical selection network 100 regardless of which input port is selected. For systems in which only two optical input ports 102 are needed, the optical selection network 100 can include a single selection module 200 (N=1).

Figure 3:
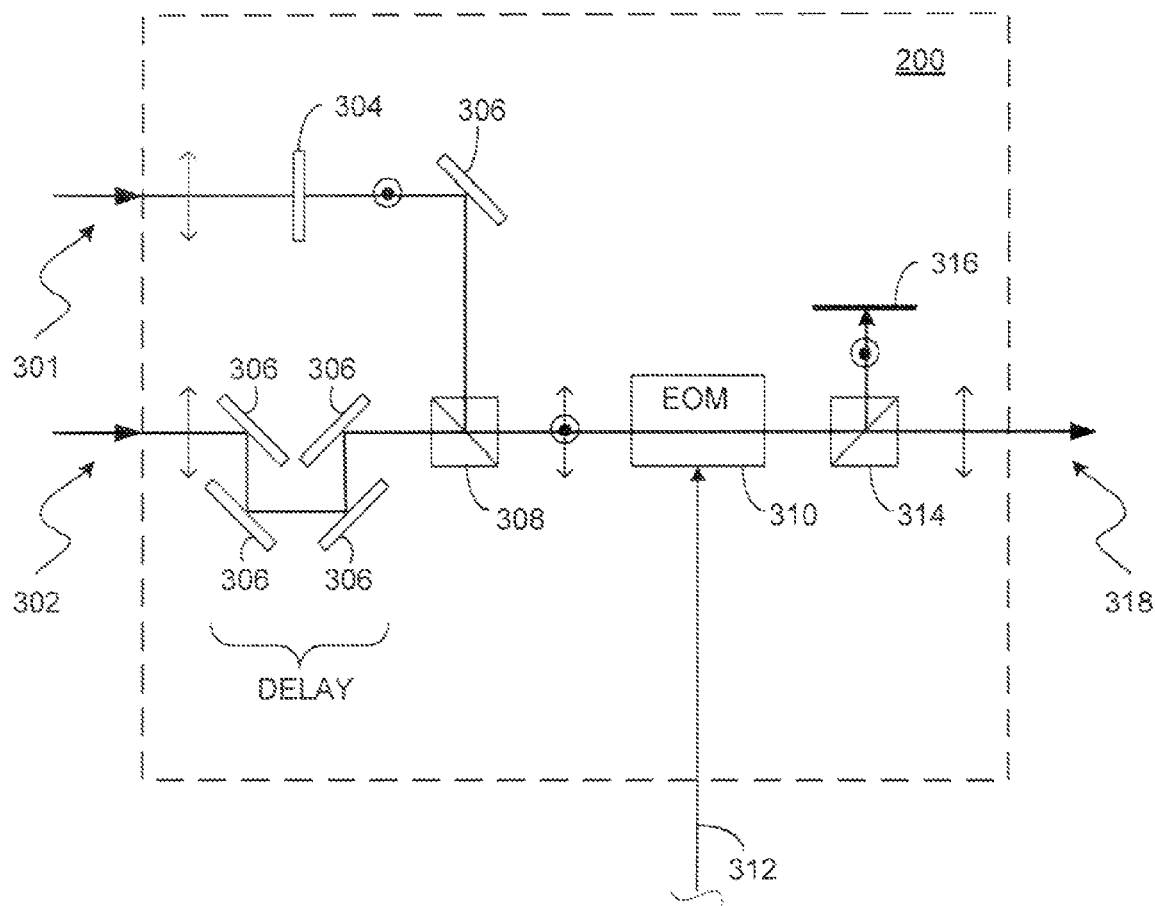
FIG. 3 is a block diagram of a selection module.

Referring to FIG. 3, an exemplary implementation of a selection module 200 has two input ports 301 and 302 each configured to receive an optical wave in a predetermined polarization state, and an output port 318 configured to provide an optical wave in a predetermined polarization state. In the illustrated example, the predetermined polarization state is a linearly polarized state (horizontal); however, the predetermined polarization state can be configured as any known polarization state using an appropriately configured polarization transforming module (e.g., a half-wave plate and a quarter-wave plate) at the input ports 301 and 302 and the output port 318.

The output port 318 of the selection module 200 at STAGE 1 of the optical selection network 100 provides the optical output port 104 and defines an output polarization state for the network 100. Thus, an optical wave propagating over the high transmission path to the optical output port 104 is placed into a polarization state that matches this output polarization state as it leaves the network 100. An optical wave propagating over a low transmission path to the optical output port 104 is, at some location along the path, placed into a polarization state that is cross-polarized with a polarization state defined by at least one polarizing optical element along the path.

A polarizing beam combiner 308 (also called a polarizing beam splitter) accepts orthogonally polarized optical waves over respective input ports and provides a combined optical wave at an output port. An optical wave arriving at the first input port 301 is rotated to an orthogonal polarization state (vertical) by a half-wave plate 304 (or other rotation element) and reflected by a mirror 306 into one input port of the polarizing beam combiner 308. An optical wave arriving at the second input port 302 is delayed by mirrors 306 (or other optical delay element) and sent into another input port of the polarizing beam combiner 308. The delay is selected so that the optical path lengths from the first 301 and second 302 input ports to the polarizing beam combiner 308 are substantially the same.

The combined optical wave from the polarizing beam combiner 308 passes through an electro-optic modulator (EOM) 310, which controls the polarization state of the combined optical wave according to an applied voltage signal 312. The voltage signal 312 is based on one or more of the control signals 110. The EOM 310 defines orthogonal axes (a "fast axis" and a "slow axis") along which the EOM 310 applies different phase shifts to fast and slow polarization components of an optical wave propagating through the EOM 310. The fast and slow axes of the EOM 310 are aligned at 45 degrees relative to the horizontal and vertical polarization states of the combined optical wave. The voltage signal 312 determines the difference between these phase shifts, or the "relative phase shift" between the fast and slow components. The electro-optic modulator 310 imparts a relative phase shift to either preserve or rotate by 90 degrees the polarization of the combined optical wave. This selection of either a preserving or rotating polarization transformation determines which of the first and second input ports 301 and 302 corresponds to a high transmission or low transmission path through the selection module 200.

A polarizing beam splitter 314 provides an output port 318 and defines a corresponding output polarization state (horizontal). If the voltage signal 312 applies a voltage to preserve the polarization state (e.g., 0 degree relative phase shift), the second input port 302 corresponds to a high transmission path through the selection module 200 and the first input port 301 corresponds to a low transmission path through the selection module 200. In this case, most of the energy in an optical wave entering the first input port 301 is reflected by the polarizing beam splitter 314 and absorbed or otherwise blocked by a beam stop 316. If the voltage signal 312 applies a voltage to rotate the polarization state by 90 degrees (e.g., 180 degree relative phase shift), the first input port 301 corresponds to a high transmission path through the selection module 200 and the second input port 302 corresponds to a low transmission path through the selection module 200. In this case, most of the energy in an optical wave entering the second input port 302 is reflected by the polarizing beam splitter 314 and absorbed or otherwise blocked by the beam stop 316. Thus, the polarizing beam splitter 314 functions as a polarizer to prevent most of the energy in an optical wave from leaving the output port 318 if the optical wave is cross-polarized with (e.g., substantially orthogonal to) the defined output polarization state.

The optical selection network 100 can be used in a variety of applications that call for a way to select an optical wave arriving at a given optical input port and block optical waves that may arrive at other ports. Unlike a device such as an optical multiplexer that couples multiple optical input ports to a given output port, the selection network 100 provides a way to block input ports that have not been selected. One category of such applications includes quantum optical systems in which a photon arriving from any of multiple paths is to be selected for further processing. Each path can be directed to a different optical input port 102 of the selection network 100. An indicator of which optical input port 102 has received a photon to be selected can be, for example, a "herald photon" indicating the presence of an associated "heralded photon." The herald photons for the respective optical input ports 102 can be detected and used to generate input signals 108 for the control module 106. An example of such a quantum optical system is the multiplexed single-photon on-demand source proposed by Migdall et al. in "Status of a multiplexed single photon on-demand source," SPIE 5102, 294-302 (2003); and "Tailoring single and multiphoton probabilities of a single photon on-demand source," Phys. Rev. A 66, 053805 (2002); each of which is incorporated herein by reference.

The Migdall source uses spontaneous parametric downconversion (SPDC) in an arrayed configuration to increase the likelihood of generating single photons in a given time interval. Before describing the arrayed configuration, it is helpful to consider the characteristics of a single parametric downconverter (PDC) as a "heralded" single-photon source. SPDC is a standard technique for generating pairs of photons in a nonlinear crystal. Pump photons, at frequency $\omega_p$, are converted into photon pairs, called signal and idler photons, with frequencies $\omega_s$ and $\omega_i$ respectively, such that $\omega_p = \omega_s + \omega_i$. For a given pump power, the probability of generating n signal/idler photon pairs within a measurement time interval T is Poisson distributed with mean value $\overline{N}$, and can be expressed as:

$$Pr(n) = \frac{\overline{N}^n e^{-\overline{N}}}{n!}$$

for n=0, 1, 2, .... For $\overline{N} \ll 1$, this Poisson distribution yields the following approximations for the probabilities of no pairs, one pair, and more than one pair:

$Pr(0) \approx 1 - \overline{N}$, $Pr(1) \approx \overline{N}$, $Pr(>1) \approx \overline{N}^2/2$.

SPDC can be utilized to herald single photons in the following way. The signal and idler photons generated from the PDC source are spatially separated, with one of the photons (e.g., the idler) being routed to a single-photon detector. For example, in type-II phase-matched parametric downconversion, the signal and idler photons can be separated with a polarizing beam splitter. In type-I phase-matched nondegenerate parametric downconversion, the signal and idler photons can be separated with a dichroic splitter. Detection of an idler photon at the detector provides a trigger event that heralds the presence of an accompanying signal photon at a corresponding known physical location.

If a single PDC source is used, a low enough pump power is typically used to yield a small value of $\overline{N}$ in order to reduce the probability of multiple-photon events, as described in more detail below. For $\overline{N} \ll 1$, we have $Pr(0) \approx 1 - \overline{N}$, so trigger events are quite rare in this case. With a perfectly efficient (unity quantum efficiency) single-photon detector and $\overline{N} \ll 1$, the probability of heralding a single signal photon is $Pr(1) \approx \overline{N}$. Standard single-photon detectors do not distinguish multiple-photon events within a certain minimum time interval T from single-photon events. Thus, a trigger event will herald the presence of more than one signal photon with probability $Pr(>1) \approx \overline{N}^2/2$. Because multiple-photon events can produce errors in quantum information processing and vulnerabilities in quantum key distribution, operation with $\overline{N} \ll 1$ is typically employed in heralded single-photon generation from a single PDC source to make such multiple-photon events rare compared to single-photon events. This regime is far from ideal for quantum information applications because the rate ($\bar{N}/T$) of heralded single signal photons is so meager. The Poisson distribution for n implies that $$\max_{\bar{N}} Pr(1) = 0.37$$

occurs at $\bar{N}=1$, but this is accompanied by a significant multiple-photon probability of $Pr(>1)=0.26$. Therefore, due to its inherent Poisson statistics, a single PDC source has limited utility as a single-photon source.

Migdall describes an array of M PDC sources to overcome the limitations imposed by the Poisson statistics of a single PDC source. The multiple-pair probability for each PDC source can be kept low ($\bar{N}\ll 1$), and by using a large enough number of sources M, the probability $M\bar{N}$ of obtaining at least one pair emission in a given time interval can be increased. Thus, with a large enough value of M, single photons can be provided in a given time slot essentially "on demand" while preserving a low probability of a multiple-photon event.

Figure 4:
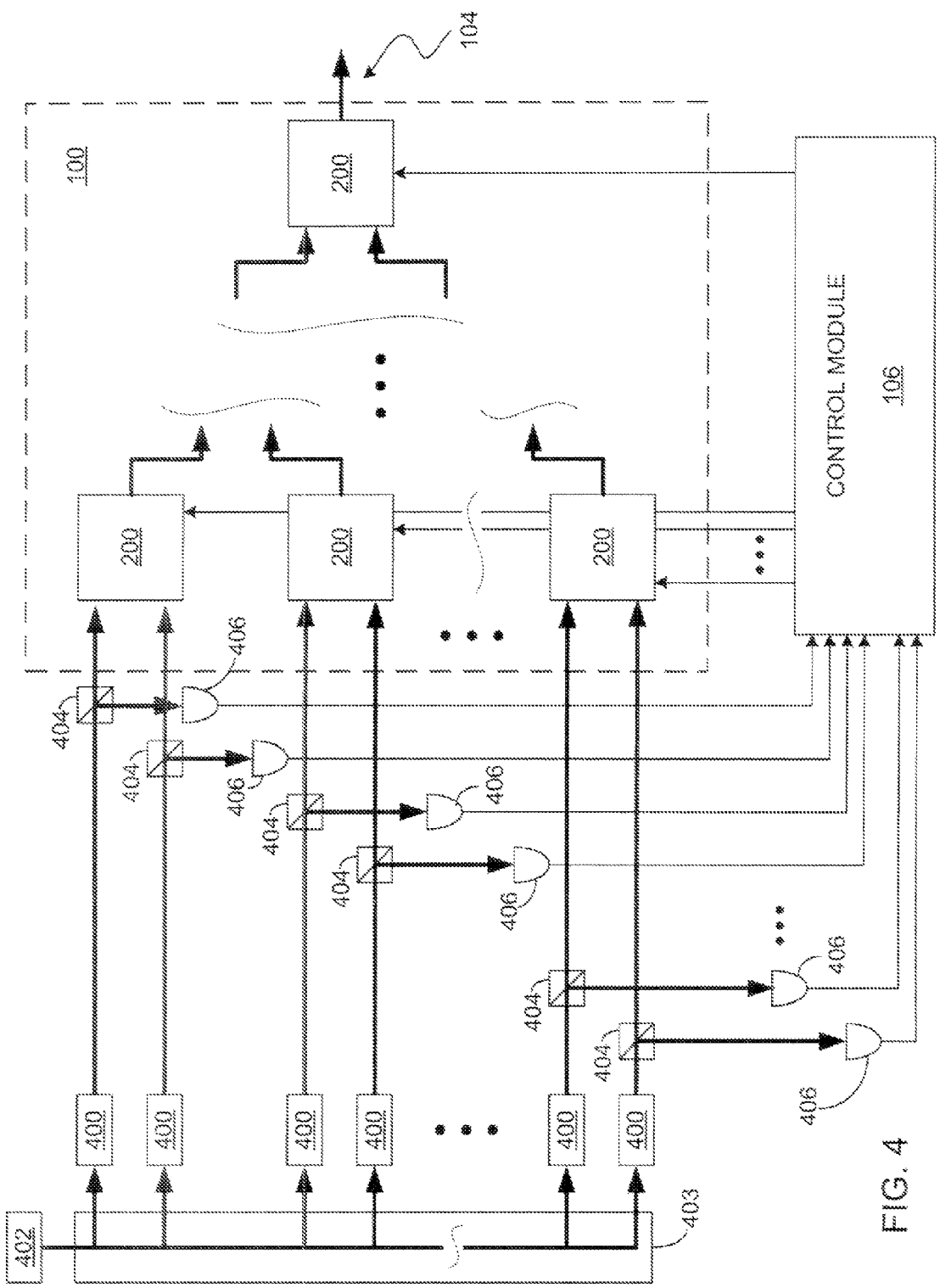
FIG. 4 is a block diagram of an arrayed parametric downconverter source using an optical selection network.

The optical selection network 100 is able to ensure that only one of the array of M PDC sources is coupled to an output port in a given time slot in a fast and low loss manner. Referring to FIG. 4, an array of PDCs 400 are pumped by a pulsed laser 402 and configured to yield substantially equal and low average pair-generation probabilities $\bar{N}\ll 1$. For example, the peak intensity and/or pulse width of pump pulses are selected such that $\bar{N}\ll 1$ for a given time slot of width T (with one pulse for each time slot). An optical delay network 403 ensures that pump pulses are delayed appropriately so that respective pump pulses arrive synchronously at each of the PDCs 400 (e.g., within a small variance compared to a pulse repetition rate or a timing tolerance based on a given component of the system).

The idler herald photons are separated from the corresponding signal photons in a beam splitter 404. As described above, if type-II phase-matching is used, the signal and idler photons can be separated with a polarizing beam splitter, or if type-I phase-matching is used, non-frequency degenerate signal and idler photons can be separated with a wavelength-dependent splitter (e.g., a dichroic splitter that passes the signal wavelength and reflects the idler wavelength). Detectors 406 are arranged to detect the idler herald photons, which provides a time reference to indicate the presence of one or more signal photons at the optical input ports of the optical selection module 100 at a known time relative to the time reference. In some implementations, the optical path lengths from each PDC 400 to a corresponding detector 406 are approximately equal so that trigger events due to idler herald photons from any of the PDCs would occur at approximately the same time. Alternatively, relatively small differences in optical path lengths could be taken into account when monitoring for trigger events.

The control module 106 receives trigger event signals from the detectors 406 (e.g., a pulse in an electronic signal) and in response provides the appropriate control signals 110 for the selection modules 200. If only one detector 406 signals a trigger event for a given time slot, the control module 106 selects the corresponding optical input port 102 to direct to the optical output port 104 over a high transmission path. For the binary tree network example, since each selection module 200 is in a high transmission state for one input port and in a low transmission state for the other input port, there is only a high transmission path to the optical output port 104 for one of the optical input ports 102 and each of the other optical input ports 102 have a low transmission path to the optical output port 104. Thus, even if there were photon pairs generated from more than one of the PDCs 400 and only one idler herald photon was detected (e.g., due to less than unity quantum efficiency of the detectors 406), only the signal photon corresponding to the detected herald photon is selected to be emitted from the optical output port 104 and any others are blocked. Similarly, if more than one detector 406 signals a trigger event for a given time slot, only one of the corresponding signal photons is selected to be emitted from the optical output port 104. The control module 106 can select which photon to emit according to a predetermined rule (e.g., always select the first one according to a sequential ordering, or select one according to a pseudorandom process). If no detector 406 signals a trigger event for a given time slot, then the control module 106 can select any optical input port 102 by default (or none of them) and it is possible that no photon will be emitted. Even in a case in which at least one detector 406 does signal a trigger event, it is still possible that no photon will be emitted since the trigger event may correspond to a "dark count" and not detection of an actual idler herald photon.

The control module 106 includes circuitry (e.g., an electronics logic board or general purpose computer running a program from a memory or computer readable medium) to apply the appropriate control signals 110 to the selection modules 200 at the correct time with respect to a time reference provided by at least one of the input signals 108. The control signals 110 can be the voltage bias signals that are applied to the EOMs 310 directly, or the control signals 110 can be logic signals corresponding to voltages to be applied to the EOMs 310 by voltage drivers, for example. In some implementations, the control signals 110 are set by default to values that provide a high transmission path for a given optical input port 102, and the detection of at least one trigger event on the input signals 108 initiates switching of the appropriate selection modules 200 at each stage of the optical selection network 100. In some implementations, instead of the control signals 110 directly switching a bias voltage applied to the EOMs 310, a periodic bias voltage can be applied to the EOMs 310 (e.g., a sine wave synchronized to a pump pulse repetition rate) so that the control signals 110 can switch the bias voltage by imposing a phase shift (e.g., 180 degrees) on the periodic waveform.

Figure 5:
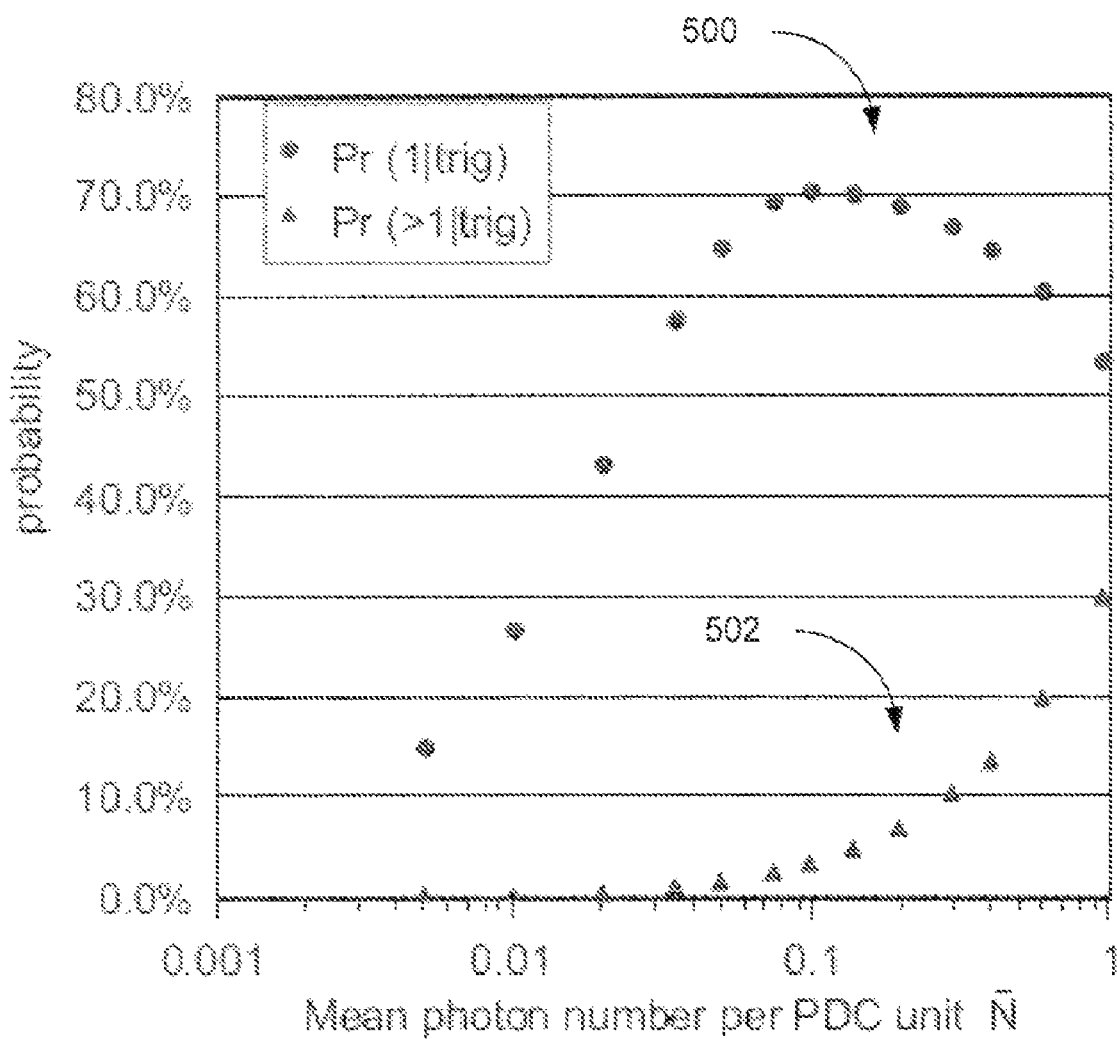
FIG. 5 are plots of single-photon and multiple-photon detection probabilities.

Referring to FIG. 5, an upper plot 500 shows the probability of emitting a single photon in a given time slot from the optical output port 104 of the configuration shown in FIG. 4 given a trigger event has occurred Pr(1|trig) as a function $\bar{N}$. A lower plot 502 shows a corresponding "error probability" of emitting more than one photon in a given time slot from the output port 104 given a trigger event has occurred Pr(>1|trig), as a function of $\bar{N}$. Both plots assume M=64 (6 stages), 95% throughput efficiency per stage, 70% detector quantum efficiency, and negligible detector dark counts. The plots also assume that the detectors 406 are single-photon detectors that are incapable of distinguishing between detection of a single idler herald photon in a time slot and detection of multiple idler herald photons in a time slot. The plots show that for a multiple-photon error probability of approximately 2.5%, the single-photon output probability reaches 70%. Even at a modest 4 stages, for the same multiple-photon error probability of 2.5%, the single-photon output probability is 50%. The system can be improved in a configuration that incorporates advances in single-photon detection, which can provide a high quantum efficiency of 88% with photon-number resolution (enabling the ability to distinguish between single and multiple idler herald photons).

Other embodiments are within the scope of the following claims.

What is claimed is:

1. An apparatus, comprising:
 a control module configured to receive one or more input signals; and an optical selection network comprising a plurality of selection modules optically coupled to form a network, and comprising a plurality of optical input ports configured to receive respective optical waves at an operative wavelength, and at least one optical output port configured to provide an optical wave at the operative wavelength;

wherein each selection module comprises at least two input ports configured to receive an optical wave in a predetermined polarization state, at least one output port configured to provide an optical wave in the predetermined polarization state, and a polarizing beam combiner configured to: receive an optical wave from a first input port in a first polarization state, receive an optical wave from a second input port rotated by a rotation element into a second polarization state, and provide a combined optical wave comprising the received optical waves;

wherein the one or more input signals identify whether an optical wave is present at a given optical input port at a given instant in time relative to a time reference in at least one of the input signals; and wherein the optical selection network is configured to receive one or more control signals from the control module, and in response to the control signals, provide a high transmission path for the operative wavelength from an optical input port, determined by the input signals, to the optical output port at a predetermined time with respect to the time reference, and provide a low transmission path for the operative wavelength from each of a plurality of optical input ports, determined by the input signals, to the optical output port at the predetermined time.

2. The apparatus of claim 1, wherein each low transmission path includes at least one polarization-dependent optical element configured to prevent most of the energy in an optical wave propagating over the low transmission path from leaving the optical output port.

3. The apparatus of claim 2, wherein the polarization-dependent optical element is configured to prevent at least 99% of the energy from leaving the optical output port.

4. The apparatus of claim 3, wherein the polarization-dependent optical element is configured to prevent at least 99.9% of the energy from leaving the optical output port.

5. The apparatus of claim 2, wherein the polarization-dependent optical element comprises a polarizing beam splitter.

6. The apparatus of claim 1, wherein the optical selection network is configured to place an optical wave propagating over a low transmission path into a polarization state that is cross-polarized with a polarization state defined by at least one polarizing optical element along the path.

7. The apparatus of claim 1, wherein the optical selection network is configured to place the optical wave propagating over the high transmission path into a polarization state that matches a polarization state defined by the optical output port.

8. The apparatus of claim 1, wherein the high transmission path and each low transmission path have substantially the same optical path length from the respective optical input port to the optical output port.

9. The apparatus of claim 1, wherein providing the high and low transmission paths comprises changing a polarization transformation imparted by the optical selection network.

10. The apparatus of claim 9, wherein changing the polarization transformation imparted by the optical selection network comprises changing a polarization rotation imparted to a substantially linear polarization state.

11. The apparatus of claim 9, wherein changing the polarization transformation imparted by the optical selection network comprises changing a relative phase shift imparted to polarization components along orthogonal polarization axes.

12. The apparatus of claim 9, wherein changing the polarization transformation imparted by the optical selection network comprises applying a voltage to at least one electro-optic modulator.

13. The apparatus of claim 1, further comprising an electro-optic modulator in optical communication with the polarizing beam combiner configured to control the polarization state of the combined optical wave based on one or more of the control signals.

14. The apparatus of claim 1, wherein providing the high and low transmission paths comprises changing a polarization transformation imparted by a subset of the optical modules determined by the input signals.

15. The apparatus of claim 1, wherein the selection modules are optically coupled to form a network having a tree topology.

16. The apparatus of claim 15, wherein the selection modules are optically coupled to form a network having a binary tree topology.

17. A method, comprising:

receiving, at a plurality of optical input ports of a plurality of selection modules optically coupled to form a network, respective optical waves at an operative wavelength, and providing an optical wave at the operative wavelength at at least one optical output port;

wherein each selection module receives, at at least two input ports, an optical wave in a predetermined polarization state, provides, at at least one output port, an optical wave in the predetermined polarization state, and at a polarizing beam combiner: receives an optical wave from a first input port in a first polarization state, receives an optical wave from a second input port rotated by a rotation element into a second polarization state, and provides a combined optical wave comprising the received optical waves;

receiving one or more input signals that identify whether an optical wave is present at a given optical input port at a given instant in time relative to a time reference in at least one of the input signals;

providing one or more control signals based on the input signals; and in response to the control signals, providing a high transmission path for the operative wavelength from an optical input port, determined by the input signals, to the optical output port at a predetermined time with respect to the time reference, and providing a low transmission path for the operative wavelength from each of a plurality of optical input ports, determined by the input signals, to the optical output port at the predetermined time.

18. The method of claim 17, wherein each low transmission path prevents most of the energy in an optical wave propagating over the low transmission path from leaving the optical output port based on polarization of the optical wave.

19. The method of claim 18, wherein each low transmission path prevents at least 99% of the energy from leaving the optical output port.

20. The method of claim 19, wherein each low transmission path prevents at least 99.9% of the energy from leaving the optical output port.

21. The method of claim 17, further comprising placing an optical wave propagating over a low transmission path into a polarization state that is cross-polarized with a polarization state defined by at least one polarizing optical element along the path.

22. The method of claim 17, further comprising placing the optical wave propagating over the high transmission path into a polarization state that matches a polarization state defined by the optical output port.

23. The method of claim 17, wherein the high transmission path and each low transmission path have substantially the same optical path length from the respective optical input port to the optical output port.

24. The method of claim 17, wherein providing the high and low transmission paths comprises changing a polarization transformation imparted to an optical wave propagating over at least one of the high and low transmission paths.

25. The method of claim 24, wherein changing the polarization transformation imparted to the optical wave comprises changing a polarization rotation imparted to a substantially linear polarization state.

26. The method of claim 25, wherein changing the polarization transformation imparted to the optical wave comprises changing a relative phase shift imparted to polarization components along orthogonal polarization axes.

27. The method of claim 25, wherein changing the polarization transformation imparted to the optical wave comprises applying a voltage to at least one electro-optic modulator.

28. A system, comprising:
a plurality of photon generation modules, each providing at least two photons generated in the same optical interaction including a heralded photon and an associated herald photon;
a control module configured to detect at least some of the herald photons from each of the photon generation modules; and
an optical selection network comprising a plurality of selection modules optically coupled to form a network having a binary tree topology, wherein each selection module includes at least two optical input ports and at least one optical output port, and the optical selection network is configured to emit a selected one of the heralded photons based on one or more control signals from the control module;
wherein each selection module comprises at least two input ports configured to receive an optical wave in a predetermined polarization state, at least one output port configured to provide an optical wave in the predetermined polarization state, and a polarizing beam combiner configured to: receive an optical wave from a first input port in a first polarization state, receive an optical wave from a second input port rotated by a rotation element into a second polarization state, and provide a combined optical wave comprising the received optical waves.

29. The system of claim 28, wherein the photon generation modules comprise parametric downconverters, each providing a pair of signal and idler photons generated in a spontaneous parametric downconversion interaction as the heralded photon and associated herald photon.

30. The system of claim 29, further comprising respective polarizing beam splitters to separate orthogonally polarized signal and idler photons generated by the parametric downconverters.

31. The system of claim 29, further comprising respective wavelength-dependent splitters to separate signal and idler photons generated by the parametric downconverters based on wavelength.

32. The system of claim 29, further comprising a pump laser to provide a pump optical wave to each of the parametric downconverters.

33. The system of claim 32, wherein the pump optical wave comprises pulses.

34. The system of claim 33, further comprising an optical delay network configured to provide the pump pulses to the parametric downconverters synchronously.

35. The apparatus of claim 1, wherein the control module is configured to provide the one or more control signals to select a first optical input port identified by the input signals as having an optical wave present at the given instant in time to be the optical input port from which the high transmission path is provided.

36. The apparatus of claim 35, wherein the control module is configured to provide the one or more control signals to select all optical input ports other than the selected first optical input port to be the optical input ports from which the low transmission paths are provided.

37. The method of claim 17, wherein providing one or more control signals based on the input signals comprises selecting a first optical input port identified by the input signals as having an optical wave present at the given instant in time to be the optical input port from which the high transmission path is provided.

38. The method of claim 37, wherein providing one or more control signals based on the input signals further comprises selecting all of the optical input ports other than the selected first optical input port to be the optical input ports from which the low transmission path is provided.

* * * * *

UNITED STATES PATENT AND TRADEMARK OFFICE
CERTIFICATE OF CORRECTION

| | | |
|---|---|---|
| PATENT NO. | : 7,877,012 B2 | Page 1 of 1 |
| APPLICATION NO. | : 11/760241 | |
| DATED | : January 25, 2011 | |
| INVENTOR(S) | : Jeffrey H. Shapiro et al. | |

It is certified that error appears in the above-identified patent and that said Letters Patent is hereby corrected as shown below:

In Column 1, Line 8, insert -- STATEMENT AS TO FEDERALLY SPONSORED RESEARCH
This invention was made with government support under grant number 60NANB5D1004 awarded by the National Institute of Standards and Technology. The government has certain rights in this invention. --

Signed and Sealed this
Fifteenth Day of March, 2011

David J. Kappos
*Director of the United States Patent and Trademark Office*